(12) United States Patent
Paturu (10) Patent No.: US 12,051,426 B2
(45) Date of Patent: Jul. 30, 2024

(54) METHOD AND SYSTEM FOR DATA TRANSMISSION BY USING SOUND

(71) Applicant: JPMorgan Chase Bank, N.A., New York, NY (US)

(72) Inventor: Praneeth Paturu, Andhra Pradesh (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 418 days.

(21) Appl. No.: 17/644,879

(22) Filed: Dec. 17, 2021

(65) Prior Publication Data

US 2022/0201470 A1 Jun. 23, 2022

Related U.S. Application Data

(60) Provisional application No. 63/144,236, filed on Feb. 1, 2021.

(30) Foreign Application Priority Data

Dec. 19, 2020 (IN) .............................. 202011055353

(51) Int. Cl.
| | |
|---|---|
| *G10L 19/005* | (2013.01) |
| *G06Q 20/32* | (2012.01) |
| *G10L 19/24* | (2013.01) |
| *H04B 11/00* | (2006.01) |
| *H04R 1/40* | (2006.01) |
| *H04R 3/00* | (2006.01) |
| *H04W 12/03* | (2021.01) |

(52) U.S. Cl.
CPC ........ *G10L 19/005* (2013.01); *G06Q 20/3272* (2013.01); *G10L 19/24* (2013.01); *H04B 11/00* (2013.01); *H04R 1/406* (2013.01); *H04R 3/005* (2013.01); *H04W 12/03* (2021.01); *G06Q 2220/00* (2013.01)

(58) Field of Classification Search
CPC .................. G10L 19/005; G10L 19/24; G06Q 20/3272; G06Q 2220/00; H04B 11/00; H04R 1/406; H04R 3/005; H04R 27/00; H04R 2227/00; H04W 12/03; H04W 12/033; H04W 12/50; H04L 63/0435; H04L 63/0838
See application file for complete search history.

(56) References Cited

U.S. PATENT DOCUMENTS

| | | | |
|---|---|---|---|
| 11,622,267 B2 * | 4/2023 | Flanagan | G10L 15/1822 726/5 |
| 2019/0386984 A1 * | 12/2019 | Thakkar | H04L 63/18 |
| 2022/0201470 A1 * | 6/2022 | Paturu | G10L 19/005 |

* cited by examiner

*Primary Examiner* — Daniel Pihulic
(74) *Attorney, Agent, or Firm* — Greenblum & Bernstein, P.L.C.

(57) ABSTRACT

A method for facilitating transfer of data by using sound is provided. The method includes receiving, via a graphical user interface, a request, the request relating to a transfer of a file; retrieving the file from a memory; encrypting, by using a token, the retrieved file; encoding the encrypted file into sound data, the sound data relating to an audio file format; and converting, via a first electroacoustic transducer, the encoded sound data into an acoustic wave.

20 Claims, 7 Drawing Sheets

METHOD AND SYSTEM FOR DATA TRANSMISSION BY USING SOUND

CROSS-REFERENCE TO RELATED APPLICATIONS

This application claims the benefit of Indian Provisional Patent Application No. 202011055353, filed Dec. 19, 2020, which is hereby incorporated by reference in its entirety. This application also claims the benefit of U.S. Provisional Patent Application Ser. No. 63/144,236, filed Feb. 1, 2021, which is hereby incorporated by reference in its entirety.

BACKGROUND

1. Field of the Disclosure

This technology generally relates to methods and systems for data transmission, and more particularly to methods and systems for facilitating transfer of data between devices by using sound waves.

2. Background Information

Many business entities utilize numerous communication standards to communicate with and provide services to customer devices. These communication standards may include, for example, a near field communication (NFC) standard, a BLUETOOTH communication standard, and a WI-FI communication standard. Historically, such communication standards have resulted in varying degrees of success with respect to hardware costs, platform dependencies, and ease of use for the customer.

One drawback of using a conventional communication standard is that in many instances, the communication standard requires expensive peripherals for the business entity and expensive hardware components for the user device. For example, to implement the NFC communication standard for cashless transactions, the business entity must invest in expensive NFC readers. Additionally, conventional communication standards may be platform dependent as well as requiring an existing network to function. As a result, implementation of a conventional communication standard is difficult and costly for the business entity.

Therefore, there is a need for a device agnostic and a platform agnostic system that, by utilizing sound waves as a communication standard, facilitates the transfer of data between devices without requiring additional hardware.

SUMMARY

The present disclosure, through one or more of its various aspects, embodiments, and/or specific features or sub-components, provides, inter alia, various systems, servers, devices, methods, media, programs, and platforms for facilitating transfer of data between devices by using sound waves.

According to an aspect of the present disclosure, a method for facilitating transfer of data by using sound is disclosed. The method is implemented by at least one processor. The method may include receiving, via a graphical user interface, a request, the request may relate to a transfer of at least one file; retrieving the at least one file from a memory; encrypting, by using at least one token, the retrieved at least one file; encoding the encrypted at least one file into sound data, the sound data may relate to an audio file format; and converting, via at least one first electroacoustic transducer, the encoded sound data into at least one acoustic wave.

In accordance with an exemplary embodiment, the method may further include receiving, via at least one second electroacoustic transducer, the at least one acoustic wave; converting the at least one acoustic wave into the sound data; decoding the sound data into the at least one file; decrypting, by using the at least one token, the at least one file; and displaying, via the graphical user interface, the at least one file.

In accordance with an exemplary embodiment, the encoding and the decoding may include at least one from among an adaptive coding algorithm and an error correction algorithm to enable real-time, one-pass data transmission.

In accordance with an exemplary embodiment, the converting of the encoded sound data may include binary data transmission based on a frequency modulation key shifting framework.

In accordance with an exemplary embodiment, the at least one acoustic wave may include at least one from among an audible sound wave and an inaudible ultrasonic sound wave.

In accordance with an exemplary embodiment, the method may further include receiving, via a plurality of third electroacoustic transducers, the at least one acoustic wave from a device; and determining a location of the device by calculating at least one from among a distance and a direction of the at least one acoustic wave from each of the plurality of third electroacoustic transducers.

In accordance with an exemplary embodiment, the method may further include receiving, via at least one fourth electroacoustic transducer, the at least one acoustic wave from a device; parsing the at least one acoustic wave to identify a pairing token; and initiating, by the at least one processor, a pairing with the device based on the pairing token, the pairing may relate to a wireless link with the device.

In accordance with an exemplary embodiment, the pairing token may include at least one predetermined parameter, the at least one predetermined parameter may include a one-time use parameter.

In accordance with an exemplary embodiment, the method may further include receiving, via at least one fifth electroacoustic transducer, the at least one acoustic wave from a device; parsing the at least one acoustic wave to identify a payment token and payment information, the payment information may include an account identifier; and initiating a payment transaction based on the payment token and the payment information.

According to an aspect of the present disclosure, a computing device configured to implement an execution of a method for facilitating transfer of data by using sound is disclosed. The computing device including a processor; a memory; and a communication interface coupled to each of the processor and the memory, wherein the processor may be configured to receive, via a graphical user interface, a request, the request may relate to a transfer of at least one file; retrieve the at least one file from a memory; encrypt, by using at least one token, the retrieved at least one file; encode the encrypted at least one file into sound data, the sound data may relate to an audio file format; and convert, via at least one first electroacoustic transducer, the encoded sound data into at least one acoustic wave.

In accordance with an exemplary embodiment, the processor may be further configured to receive, via at least one second electroacoustic transducer, the at least one acoustic wave; convert the at least one acoustic wave into the sound data; decode the sound data into the at least one file; decrypt, by using the at least one token, the at least one file; and display, via the graphical user interface, the at least one file.

In accordance with an exemplary embodiment, the encoding and the decoding may include at least one from among an adaptive coding algorithm and an error correction algorithm to enable real-time, one-pass data transmission.

In accordance with an exemplary embodiment, the converting of the encoded sound data may include binary data transmission based on a frequency modulation key shifting framework.

In accordance with an exemplary embodiment, the at least one acoustic wave may include at least one from among an audible sound wave and an inaudible ultrasonic sound wave.

In accordance with an exemplary embodiment, the processor may be further configured to receive, via a plurality of third electroacoustic transducers, the at least one acoustic wave from a device; and determine a location of the device by calculating at least one from among a distance and a direction of the at least one acoustic wave from each of the plurality of third electroacoustic transducers.

In accordance with an exemplary embodiment, the processor may be further configured to receive, via at least one fourth electroacoustic transducer, the at least one acoustic wave from a device; parse the at least one acoustic wave to identify a pairing token; and initiate a pairing with the device based on the pairing token, the pairing may relate to a wireless link with the device.

In accordance with an exemplary embodiment, the pairing token may include at least one predetermined parameter, the at least one predetermined parameter may include a one-time use parameter.

In accordance with an exemplary embodiment, the processor may be further configured to receive, via at least one fifth electroacoustic transducer, the at least one acoustic wave from a device; parse the at least one acoustic wave to identify a payment token and payment information, the payment information may include an account identifier; and initiate a payment transaction based on the payment token and the payment information.

According to an aspect of the present disclosure, a non-transitory computer readable storage medium storing instructions for facilitating transfer of data by using sound is disclosed. The storage medium including executable code which, when executed by a processor, may cause the processor to receive, via a graphical user interface, a request, the request may relate to a transfer of at least one file; retrieve the at least one file from a memory; encrypt, by using at least one token, the retrieved at least one file; encode the encrypted at least one file into sound data, the sound data may relate to an audio file format; and convert, via at least one first electroacoustic transducer, the encoded sound data into at least one acoustic wave.

In accordance with an exemplary embodiment, the converting of the encoded sound data may include binary data transmission based on a frequency modulation key shifting framework.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
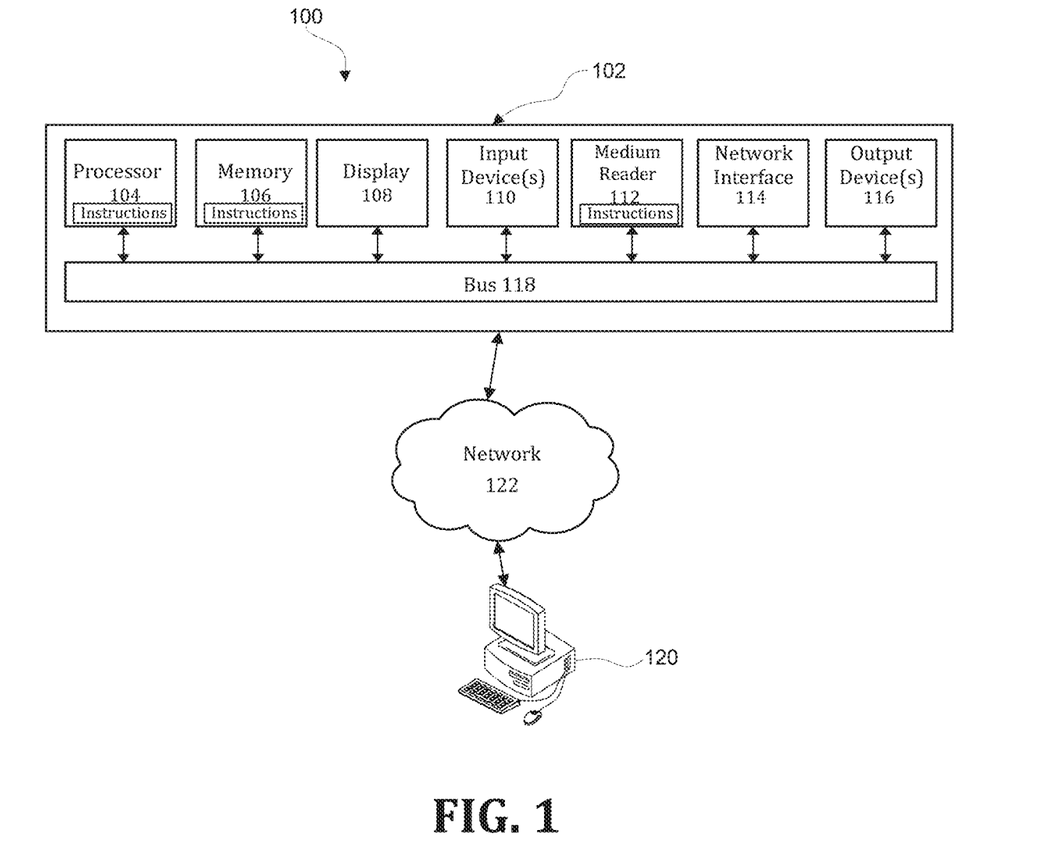
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating transfer of data between devices by using sound waves.

Figure 2:
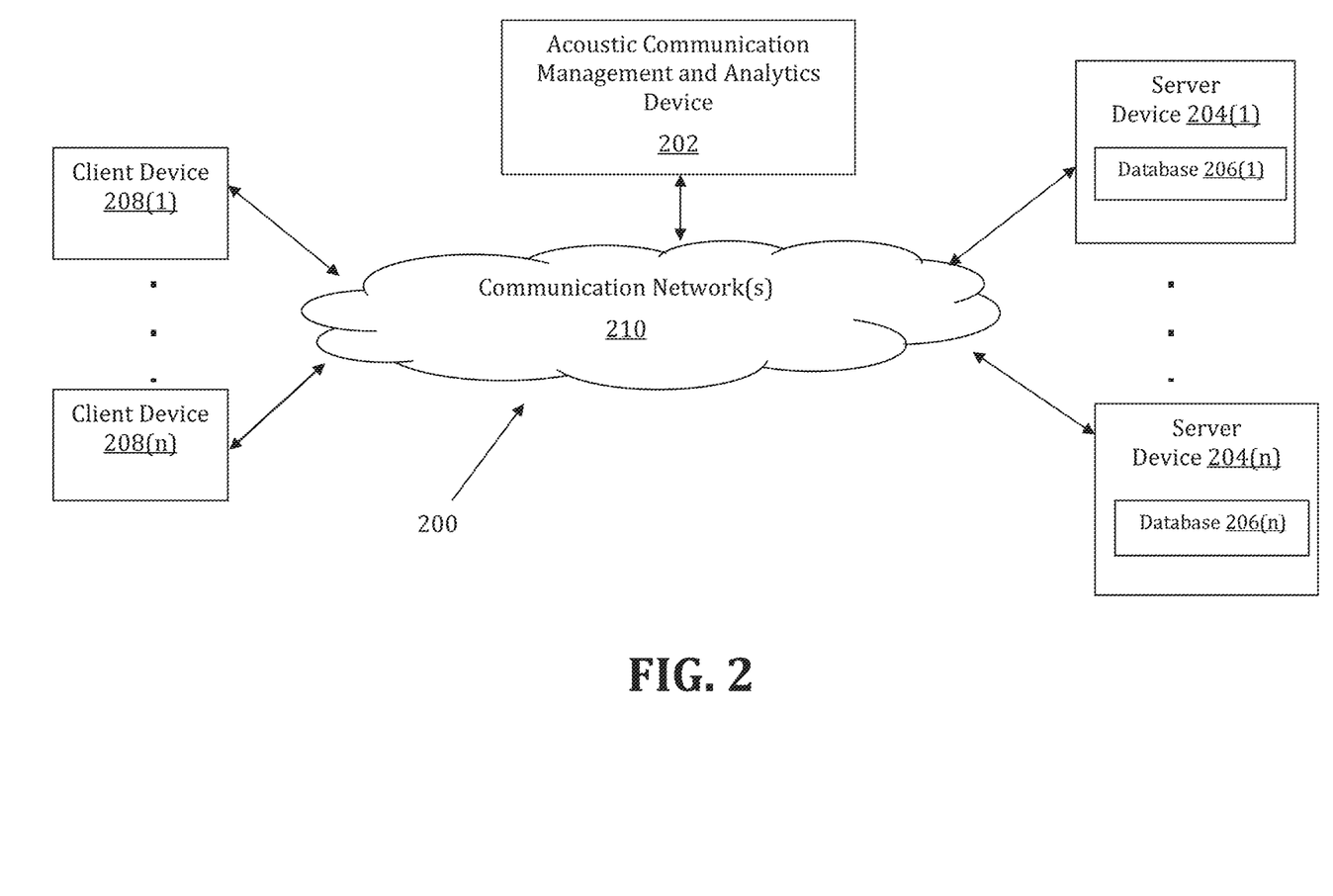
FIG. 2 illustrates an exemplary diagram of a network environment.

Referring to FIG. 2, a schematic of an exemplary network environment 200 for implementing a method for facilitating transfer of data between devices by using sound waves is illustrated. In an exemplary embodiment, the method is executable on any networked computer platform, such as, for example, a personal computer (PC).

The method for facilitating transfer of data between devices by using sound waves may be implemented by an Acoustic Communication Management and Analytics (ACMA) device 202. The ACMA device 202 may be the same or similar to the computer system 102 as described with respect to FIG. 1. The ACMA device 202 may store one or more applications that can include executable instructions that, when executed by the ACMA device 202, cause the ACMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACMA device 202 itself, may be located in virtual server(s) running in a cloud-based computing environment rather than being tied to one or more specific physical network computing devices. Also, the application(s) may be running in one or more virtual machines (VMs) executing on the ACMA device 202. Additionally, in one or more embodiments of this technology, virtual machine(s) running on the ACMA device 202 may be managed or supervised by a hypervisor.

In the network environment 200 of FIG. 2, the ACMA device 202 is coupled to a plurality of server devices 204(1)-204(n) that hosts a plurality of databases 206(1)-206(n), and also to a plurality of client devices 208(1)-208(n) via communication network(s) 210. A communication interface of the ACMA device 202, such as the network interface 114 of the computer system 102 of FIG. 1, operatively couples and communicates between the ACMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ACMA devices that efficiently implement a method for facilitating transfer of data between devices by using sound waves.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ACMA device 202 may be a standalone device or integrated with one or more other devices or apparatuses, such as one or more of the server devices 204(1)-204(n), for example. In one particular example, the ACMA device 202 may include or be hosted by one of the server devices 204(1)-204(n), and other arrangements are also possible. Moreover, one or more of the devices of the ACMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to transmitted data files, received data files, transmitted audio files, received audio files, and user authentication data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ACMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ACMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ACMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ACMA device 202, the server devices 204(1)-204(n), or the client devices 208(1)-208(n), for example, may be configured to operate as virtual instances on the same physical machine. In other words, one or more of the ACMA device 202, the server devices 204(1)-204(n), or the client devices 208(1)-208(n) may operate on the same physical device rather than as separate devices communicating through communication network(s) 210. Additionally, there may be more or fewer ACMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
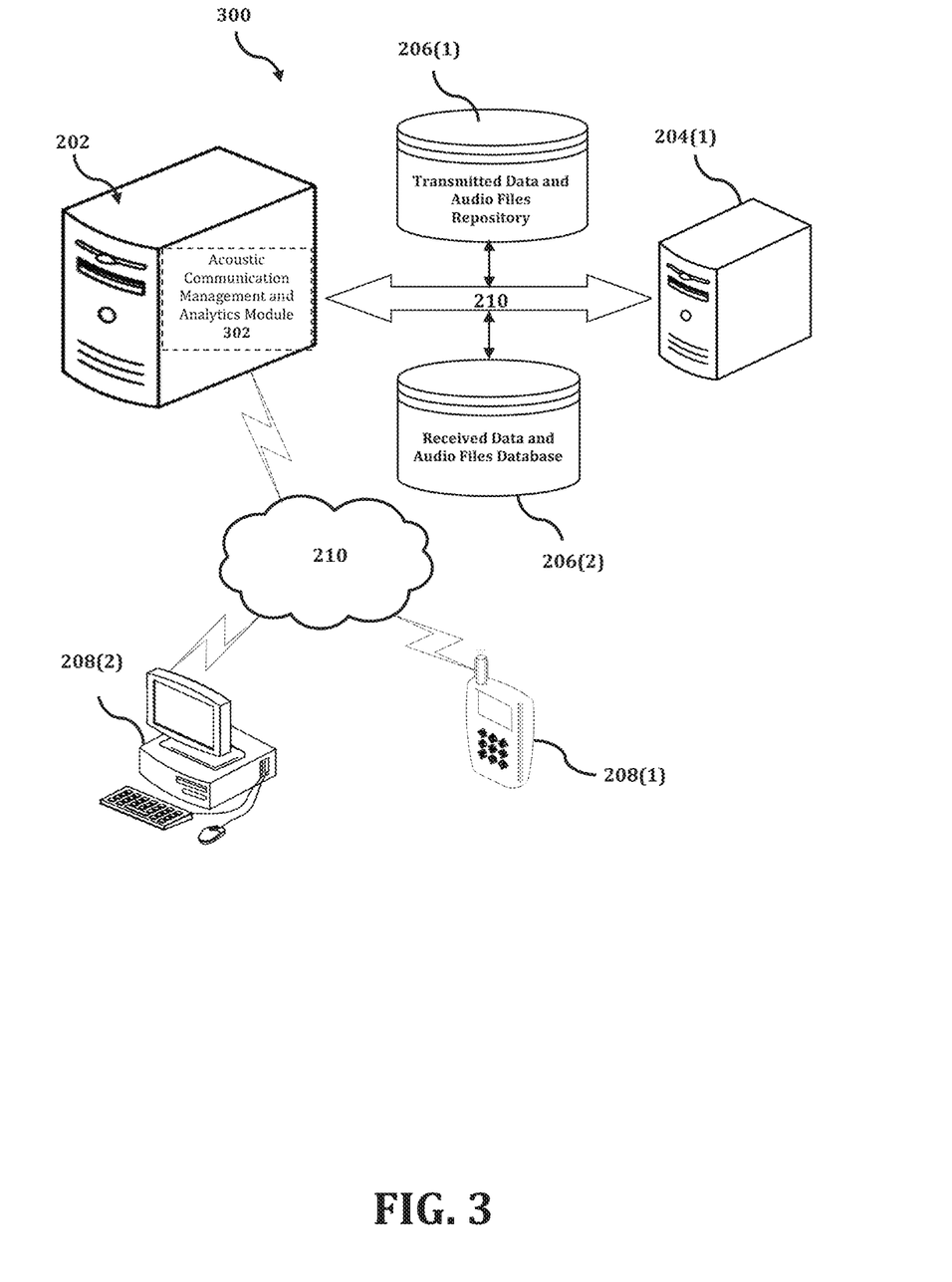
FIG. 3 shows an exemplary system for implementing a method for facilitating transfer of data between devices by using sound waves.

The ACMA device 202 is described and shown in FIG. 3 as including an acoustic communication management and analytics module 302, although it may include other rules, policies, modules, databases, or applications, for example. As will be described below, the acoustic communication management and analytics module 302 is configured to implement a method for facilitating transfer of data between devices by using sound waves.

An exemplary process 300 for implementing a mechanism for facilitating transfer of data between devices by using sound waves by utilizing the network environment of FIG. 2 is shown as being executed in FIG. 3. Specifically, a first client device 208(1) and a second client device 208(2) are illustrated as being in communication with ACMA device 202. In this regard, the first client device 208(1) and the second client device 208(2) may be "clients" of the ACMA device 202 and are described herein as such. Nevertheless, it is to be known and understood that the first client device 208(1) and/or the second client device 208(2) need not necessarily be "clients" of the ACMA device 202, or any entity described in association therewith herein. Any additional or alternative relationship may exist between either or both of the first client device 208(1) and the second client device 208(2) and the ACMA device 202, or no relationship may exist.

Further, ACMA device 202 is illustrated as being able to access a transmitted data and audio files repository 206(1) and a received data and audio files database 206(2). The acoustic communication management and analytics module 302 may be configured to access these databases for implementing a method for facilitating transfer of data between devices by using sound waves.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ACMA device 202 via broadband or cellular communication. Of course, these embodiments are merely exemplary and are not limiting or exhaustive.

Upon being started, the acoustic communication management and analytics module 302 executes a process for facilitating transfer of data between devices by using sound waves. An exemplary process for facilitating transfer of data between devices by using sound waves is generally indicated at flowchart 400 in FIG. 4.

Figure 4:
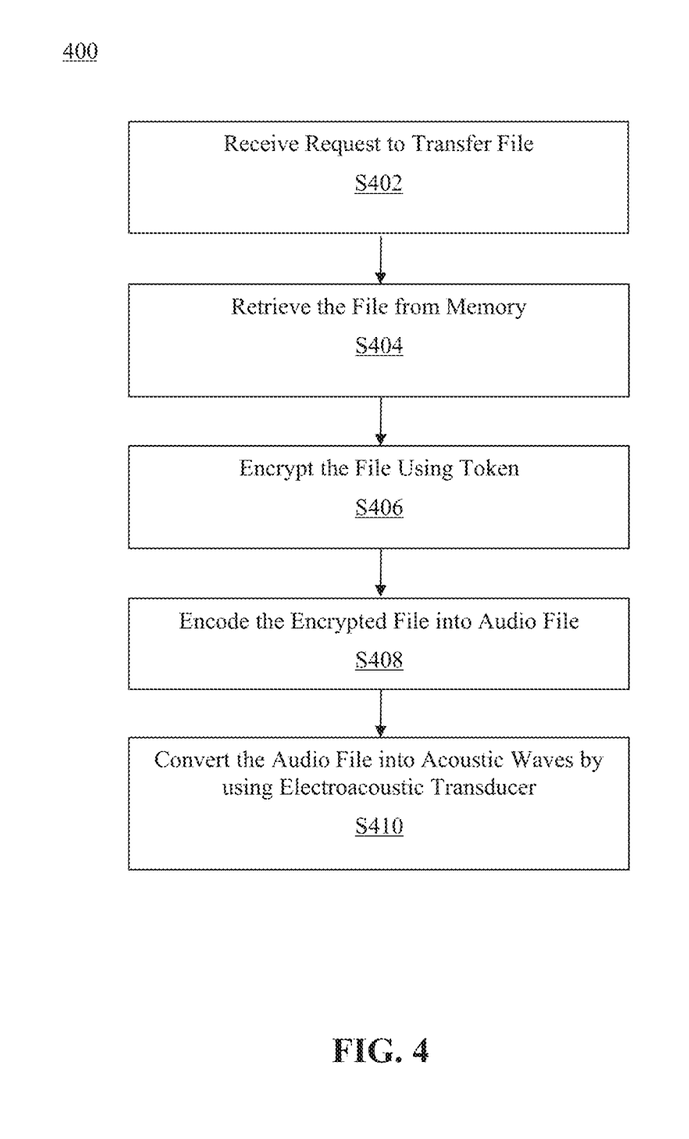
FIG. 4 is a flowchart of an exemplary process for implementing a method for facilitating transfer of data between devices by using sound waves.

In the process 400 of FIG. 4, at step S402, a request relating to a transfer of a computer file may be received via a graphical user interface. The request may be initiated on the graphical user interface of a first device. In an exemplary embodiment, the transfer of a file may include the transfer of a computer file from one location to another. As will be appreciated by a person of ordinary skill in the art, the computer file may be moved from one location to another for file relocation purposes such as, for example, sharing of a picture with a friend, for communication purposes such as, for example, sending of a message to another user, as well as for authentication purposes such as, for example, sharing of account information with a banking terminal to initiate a transaction.

In another exemplary embodiment, the graphical user interface may include a form of user interface that enables a user to interact with electronic devices through graphical icons and audio indicators such as, for example, a primary notation. In another exemplary embodiment, the request may be received via a text-based user interface which incorporates typed command labels and text navigation. In another exemplary embodiment, the request may be received via an application such as, for example, a monolithic application and a microservice application that performs automated functions based on a given input.

At step S404, the computer file corresponding to the request may be retrieved from a memory. The computer file may be located within a memory of a device as well as in the memory of a networked device such as, for example, in a cloud storage platform. In an exemplary embodiment, the memory may correspond to a component that is used to store information for use in a computing device. The memory may incorporate recording media that is used to retain data. As will be appreciated by a person of ordinary skill in the art, the memory may utilize a binary numeral system to convert data into binary digits as well as utilize data compression methodologies to represent a string of bits by a short bit string for storage.

At step S406, the retrieved computer file may be encrypted by using a token. In an exemplary embodiment, an automated process such as, for example, a handshake process of negotiation between two devices through the exchange of information that establishes the protocols of a communication link at the start of the communication may be utilized. For example, a handshake process utilizing a unique, one-time use token may provide ad-hoc pairing between a mobile phone and any online screen. After the pairing, a customer may conduct financial transactions without the need for secondary authentication techniques such as, for example, a Cue code and a short message service (SMS) code. By directly pairing the two devices, attack vectors such as, for example, man-in-the-middle threats and friendly frauds may be reduced.

In another exemplary embodiment, the computer file may be encrypted on a file-by-file basis before transmission. An encryption process may convert the computer file into an alternative form. An encryption algorithm may convert the computer file into a ciphertext to transform the original data to a non-readable format accessible only to authorized parties who may decrypt the data back to a readable format. As will be appreciated by a person of ordinary skill in the art, the process of encrypting and decrypting messages may utilize keys such as, for example, symmetric keys as well as an asymmetric key.

At step S408, the encrypted computer file may be encoded into sound data that relates to an audio file format. In an exemplary embodiment, the audio file format may include file formats that are utilized for storing digital audio data on a computer system. The sound data may be uncompressed or compressed to reduce file size. The sound data may also be embedded in a container format as well as an audio data format with defined storage layers.

In another exemplary embodiment, the encoding of the computer file may include a utilization of at least one from among an adaptive coding algorithm and an error correction algorithm to enable real-time, one-pass data transmission. The adaptive coding algorithm may include algorithms such as, for example, an adaptive Huffman coding algorithm that permits building of computer codes as the code itself is transmitted without initial knowledge of source distribution. The adaptive coding algorithm may enable one-pass encoding and adaptation to changing conditions in data. The error correction algorithm may include algorithms such as, for example, a Reed Solomon error correction algorithm that operate on a block of data treated as a set of finite-field elements. The error correction algorithm may be able to detect and correct multiple symbol errors by incorporating check symbol to the data.

At step S410, the encoded sound data may be converted into acoustic waves via a first electroacoustic transducer. The acoustic waves may include a type of energy propagation through a medium by means of adiabatic compression and decompression. In an exemplary embodiment, the acoustic waves may include at least one from among an audible sound wave and an inaudible ultrasonic sound wave. The audible and inaudible sound waves may be produced by the first electroacoustic transducer. The ultrasonic sound waves may include sound with a frequency greater than 20 kilohertz. Embodiments recited within the present application may function in a range of frequencies such as, for example, between 20 kilohertz and 25 kilohertz. In another exemplary embodiment, the first electroacoustic transducer may include a device, such as, for example, a speaker which converts an electrical audio signal into a corresponding sound. Due to the operational frequency range, the sound waves may not be audible for a human.

In another exemplary embodiment, the converting of the encoded sound data may include binary data transmission based on a frequency modulation, key shifting framework. The frequency modulation, key shifting framework may include a frequency modulation scheme such as, for example, a frequency-shift keying (FSK) scheme in which digital information is transmitted through discrete frequency changes of a carrier signal. In another exemplary embodiment, the frequency modulation, key shifting framework may utilize binary frequency-shift keying. The binary frequency-shift keying may use a pair of discrete frequencies to transmit binary information.

In another exemplary embodiment, the acoustic waves may be received by a second device via a second electroacoustic transducer such as, for example, a microphone. The acoustic waves received may be converted into the sound data. The sound data may then be decoded back into the computer file. The decoded computer file may be decrypted by using the token. Then, the computer file may be displayed on the second device via the graphical user interface.

In another exemplary embodiment, the decoding of the computer file may include a use of at least one from among an adaptive coding algorithm and an error correction algorithm to enable real-time, one-pass data transmission. The adaptive coding algorithm may include algorithms such as, for example, an adaptive Huffman coding algorithm that permits building of computer codes as the code itself is transmitted without initial knowledge of source distribution. The adaptive coding algorithm may enable one-pass encoding and adaptation to changing conditions in data. The error correction algorithm may include algorithms such as, for example, a Reed Solomon error correction algorithm that operate on a block of data treated as a set of finite-field elements. The error correction algorithm may be able to detect and correct multiple symbol errors by incorporating check symbol to the data.

In another exemplary embodiment, the acoustic waves from a device may be received via a plurality of third electroacoustic transducers. A location of the device may be determined by calculating at least one from among a distance and a direction of the acoustic waves from each of the plurality of third electroacoustic transducers.

In another exemplary embodiment, a communication channel utilizing sound waves consistent with embodiments in the present application may not require additional hardware components. For example, electroacoustic transducers such as microphones and speakers may already be present in modern computing devices. As such, the communication channel may be implemented without much additional cost. Additionally, due to the ubiquity of the electroacoustic transducers, the communication channel may also be platform agnostic.

In another exemplary embodiment, a communication channel utilizing sound may enable many use cases. In an exemplary use case, the communication channel may be utilized to perform a handshake with multiple devices. The handshake may provide a unique, one-time token that may be used to provide ad-hoc pairing between a mobile device and a computing device. In another exemplary use case, the communication channel may be utilized to perform location tracking. The sound waves that are utilized by the communication channel may be utilized to pinpoint the location of a sending device. With accurate location determination, user-specific content and services may be triggered. Additionally, the accurate location determination may enable indoor navigation in an environment where conventional location techniques are inefficient.

In another exemplary use case, the communication channel may deliver a uniform, omni channel experience for cashless transactions. Payments may be transmitted in-store without the need for additional hardware. For example, automated teller machine (ATM) interactions may be contactless without requiring pin codes and/or swipe cards. The transaction may be pre-staged on the user device and a token may be utilized to identify the user.

In another exemplary use case, the communication channel may provide additional side channels for security focused functionalities. The security focused functionalities may include an authentication functionality, a verification functionality, a payment functionality, and a key exchange functionality. In another exemplary use case, the communication channel may provide additional side channels for data exchange focused functionalities. The data exchange focused functionalities may enable local and offline exchange of sensitive data. In another exemplary use case, the communication channel may provide additional side channels for location-based services. The location-based services may include object tracking services, navigation services, and NFC services.

In another exemplary use case, the communication channel may provide additional side channels for networking focused functionalities. The networking focused functionalities may include a device synchronization functionality, a device pairing functionality, an ad-hoc networking functionality, and a mesh networking functionality. In another exemplary use case, the communication channel may provide additional side channels for internet of things (IoT) focused functionalities. The IoT focused functionalities may enable multi-device communication and networking. In another exemplary use case, the communication channel may provide additional side channels for multimedia focused functionalities. The multimedia focused functionalities may include a second screen functionality and a smart home automation functionality.

In another exemplary use case, the communication channel may be utilized to pay for a bus ticket. A user may use an enabled smartphone to initiate a transaction for a bus ticket. In another exemplary use case, the communication channel may be utilized for contactless login. A user may log in to a desktop computer using an enabled smartphone and an ultrasonic authentication protocol. In another exemplary use case, the communication channel may be utilized to control smart home functionalities. A user may use an enabled smartphone as a remote control for IoT devices. In another exemplary use case, the communication channel may be utilized to autofill and initiate secure e-payments. A user may use an enabled smartphone to transmit personal data from the smartphone to a form on another computing device.

In another exemplary use case, the communication channel may be utilized for fast ATM cash withdrawals. A user may use an enabled smartphone for secure ultrasonic ATM cash withdrawals without a swipe card. In another exemplary use case, the communication channel may be utilized to unlock a car door. A user may use an enabled smartphone to unlock a car with ultrasonic sound waves. In another exemplary use case, the communication channel may be utilized to perform peer-to-peer payments. A user may use an enabled smartphone to initiate payments between other enabled smartphones. In another exemplary use case, the communication channel may be utilized to initiate payment of a payment terminal. A user may use an enabled smartphone to initiate payment with a point of sale (POS) terminal. In another exemplary use case, the communication channel may be utilized to manage meetings. A user may use an enabled smartphone to automatically provide attendance confirmation as well as to synchronize meeting contents.

In another exemplary use case, the communication channel may be utilized to provide second screen solutions. A user may use an enabled smartphone to interact with advertisements on a smart TV to receive additional information and coupons. In another exemplary use case, the communication channel may be utilized for geofencing based loyalty and couponing services. A user may use an enabled smartphone as an ultrasonic beacon for sales outlets. In another exemplary use case, the communication channel may be utilized for loyalty IoT validators. A user may use an enabled smartphone to virtualize the loyalty system and provide virtual stamps and virtual push buttons.

Figure 5:
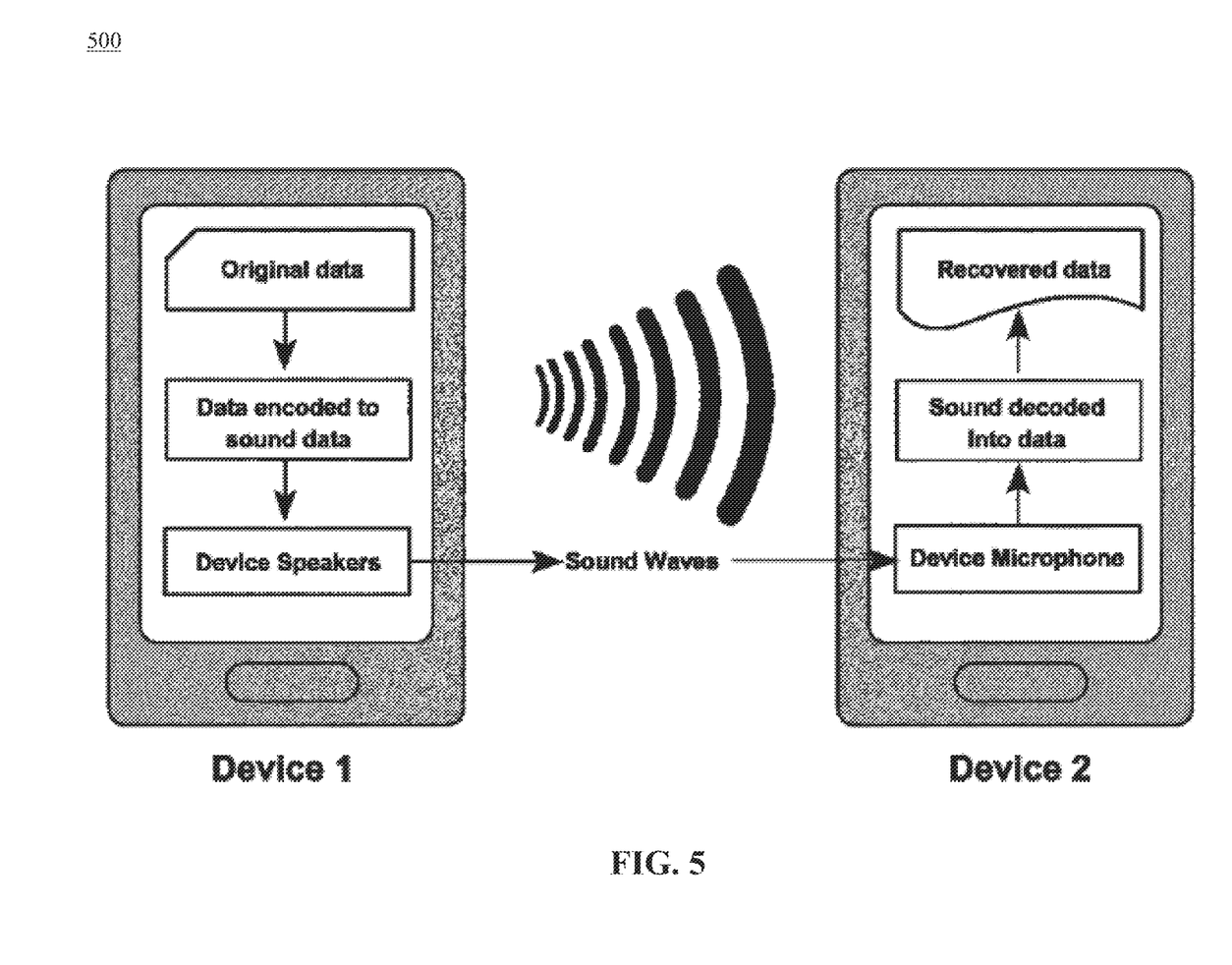
FIG. 5 is a flow diagram of an exemplary process for implementing a method for facilitating transfer of data between devices by using sound waves.

FIG. 5 is a flow diagram 500 of an exemplary process for implementing a method for facilitating transfer of data between devices by using sound waves. In flow diagram 500, a device may be used to transmit data to a second device to authenticate a customer inside a bank branch. The transmission of data for the transaction may be accomplished without network connections such as, for example, a WI-FI connection, a BLUETOOTH connection, an NFC connection, a BEACONS connection. In flow diagram 500, the data may be transmitted solely by using audible sound waves as well as inaudible, ultrasonic sound waves.

As illustrated in FIG. 5, the process begins within device 1. Device 1 may contain the original data that must be transmitted to device 2. The original data may be encoded to sound data consistent with embodiments recited in the present application. After the original data has been encoded, device speaker components in device 1 may be utilized to transmit the sound wave.

In FIG. 5, device 2 represents a device of a receiving participant to the data transmission. The receiving participant may include an individual as well as a business entity. Device 2 may receive the sound waves via a microphone component. The received sound waves may be decoded into a data file. Then, the recovered data file may be presented to the receiving participant. As will be appreciated by a person of ordinary skill in the art, the receiving participant may further process the recovered data file consistent with embodiments recited in the present application.

Figure 6A:
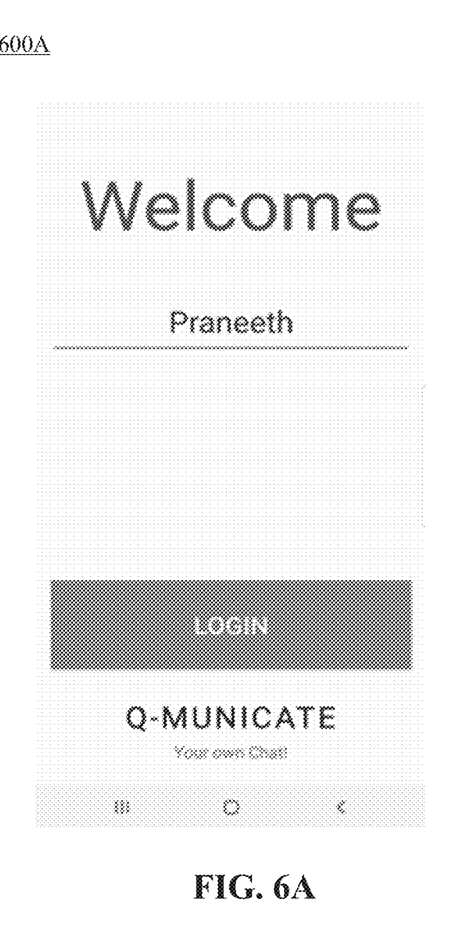
FIG. 6A is a screenshot that illustrates an opening screen of a graphical user interface that is usable for implementing a method for facilitating transfer of data between devices by using sound waves, according to an exemplary embodiment.

FIG. 6A is a screenshot 600A that illustrates an opening screen of a graphical user interface that is usable for implementing a method for facilitating transfer of data between devices by using sound waves, according to an exemplary embodiment. FIG. 6A represents an exemplary use case embodied in an application that utilizes the transfer of data via sound waves. As illustrated in FIG. 6A, the opening screen of the graphical user interface may include a welcome message and a text entry element that may receive inputs from a user. The graphical user interface may also include a user selectable element that receives an input from a user to log in to the application.

Figure 6B:
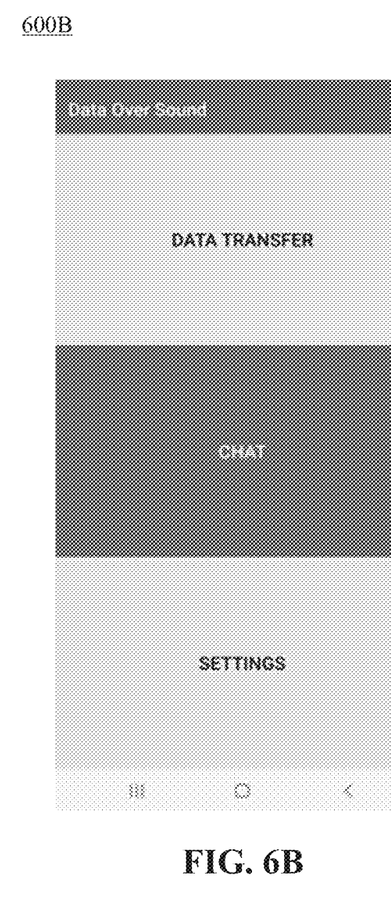
FIG. 6B is a screenshot that illustrates a choice screen of a graphical user interface that is usable for implementing a method for facilitating transfer of data between devices by using sound waves, according to an exemplary embodiment.

FIG. 6B is a screenshot 600B that illustrates a choice screen of a graphical user interface that is usable for implementing a method for facilitating transfer of data between devices by using sound waves, according to an exemplary embodiment. FIG. 6B represents an exemplary use case embodied in an application that utilizes the transfer of data via sound waves. As illustrated in FIG. 6B, the choice screen of the graphical user interface may include user selectable elements that receives an input from a user. The user selectable elements may correspond to a feature of the application such as, for example, a data transfer feature, a chat feature, and a settings feature.

Figure 6C:
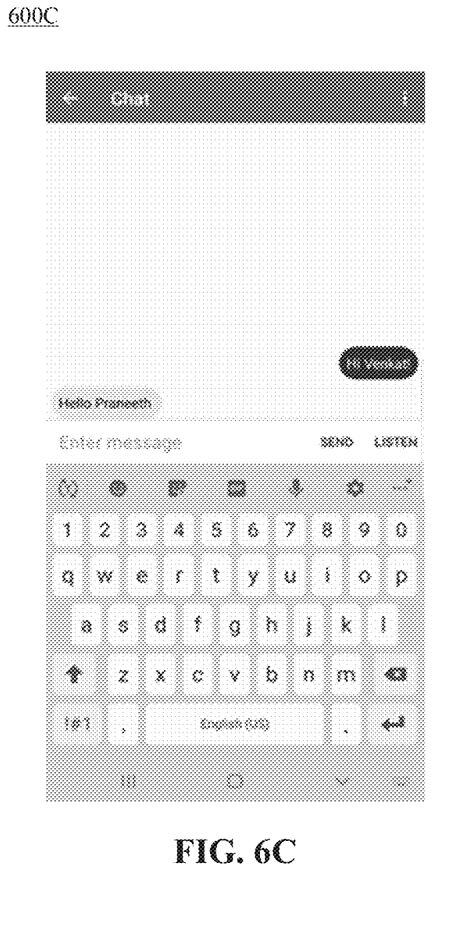
FIG. 6C is a screenshot that illustrates a sending message screen of a graphical user interface that is usable for implementing a method for facilitating transfer of data between devices by using sound waves, according to an exemplary embodiment.

FIG. 6C is a screenshot 600C that illustrates a sending message screen of a graphical user interface that is usable for implementing a method for facilitating transfer of data between devices by using sound waves, according to an exemplary embodiment. FIG. 6C represents an exemplary use case embodied in an application that utilizes the transfer of data via sound waves. As illustrated in FIG. 6C, the sending message screen of the graphical user interface may be displayed in response to a user selecting the chat feature. The sending message screen represents the graphical user interface on a device of the sender. In an exemplary embodiment, the sending message screen may include a virtual keyboard and a graphical element to display the sent and received messages. The sending message screen may also include user selectable elements such as, for example, a send button and a listen button.

Figure 6D:
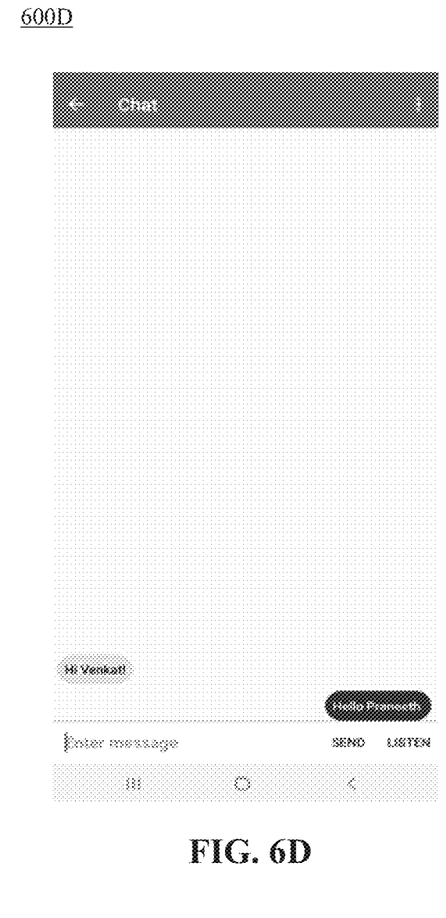
FIG. 6D is a screenshot that illustrates a receiving message screen of a graphical user interface that is usable for implementing a method for facilitating transfer of data between devices by using sound waves, according to an exemplary embodiment.

FIG. 6D is a screenshot 600D that illustrates a receiving message screen of a graphical user interface that is usable for implementing a method for facilitating transfer of data between devices by using sound waves, according to an exemplary embodiment. FIG. 6D represents an exemplary use case embodied in an application that utilizes the transfer of data via sound waves. As illustrated in FIG. 6D, the receiving message screen of the graphical user interface may be displayed on a device of a receiver in response to the sent message. In an exemplary embodiment, the receiving message screen may include a virtual keyboard and a graphical element to display the sent and received messages. The sending message screen may also include user selectable elements such as, for example, a send button and a listen button.

Accordingly, with this technology, an optimized process for facilitating transfer of data between devices by using sound waves is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating transfer of data by using sound, the method being implemented by at least one processor, the method comprising:
   receiving, by the at least one processor via a graphical user interface, a request, the request relating to a transfer of at least one file;
   retrieving, by the at least one processor, the at least one file from a memory;
   encrypting, by the at least one processor using at least one token, the retrieved at least one file;
   encoding, by the at least one processor, the encrypted at least one file into sound data, the sound data relating to an audio file format; and
   converting, by the at least one processor via at least one first electroacoustic transducer, the encoded sound data into at least one acoustic wave.

2. The method of claim 1, further comprising:
   receiving, by the at least one processor via at least one second electroacoustic transducer, the at least one acoustic wave;
   converting, by the at least one processor, the at least one acoustic wave into the sound data;
   decoding, by the at least one processor, the sound data into the at least one file;
   decrypting, by the at least one processor using the at least one token, the at least one file; and
   displaying, by the at least one processor via the graphical user interface, the at least one file.

3. The method of claim 2, wherein the encoding and the decoding include at least one from among an adaptive coding algorithm and an error correction algorithm to enable real-time, one-pass data transmission.

4. The method of claim 1, wherein the converting of the encoded sound data includes binary data transmission based on a frequency modulation key shifting framework.

5. The method of claim 1, wherein the at least one acoustic wave includes at least one from among an audible sound wave and an inaudible ultrasonic sound wave.

6. The method of claim 1, further comprising:
   receiving, by the at least one processor via a plurality of third electroacoustic transducers, the at least one acoustic wave from a device; and
   determining, by the at least one processor, a location of the device by calculating at least one from among a distance and a direction of the at least one acoustic wave from each of the plurality of third electroacoustic transducers.

7. The method of claim 1, further comprising:
   receiving, by the at least one processor via at least one fourth electroacoustic transducer, the at least one acoustic wave from a device;
   parsing, by the at least one processor, the at least one acoustic wave to identify a pairing token; and
   initiating, by the at least one processor, a pairing with the device based on the pairing token, the pairing relating to a wireless link with the device.

8. The method of claim 7, wherein the pairing token includes at least one predetermined parameter, the at least one predetermined parameter including a one-time use parameter.

9. The method of claim 1, further comprising:
receiving, by the at least one processor via at least one fifth electroacoustic transducer, the at least one acoustic wave from a device;
parsing, by the at least one processor, the at least one acoustic wave to identify a payment token and payment information, the payment information including an account identifier; and
initiating, by the at least one processor, a payment transaction based on the payment token and the payment information.

10. A computing device configured to implement an execution of a method for facilitating transfer of data by using sound, the computing device comprising:
a processor;
a memory; and
a communication interface coupled to each of the processor and the memory,
wherein the processor is configured to:
receive, via a graphical user interface, a request, the request relating to a transfer of at least one file;
retrieve the at least one file from a memory;
encrypt, by using at least one token, the retrieved at least one file;
encode the encrypted at least one file into sound data, the sound data relating to an audio file format; and
convert, via at least one first electroacoustic transducer, the encoded sound data into at least one acoustic wave.

11. The computing device of claim 10, wherein the processor is further configured to:
receive, via at least one second electroacoustic transducer, the at least one acoustic wave;
convert the at least one acoustic wave into the sound data;
decode the sound data into the at least one file;
decrypt, by using the at least one token, the at least one file; and
display, via the graphical user interface, the at least one file.

12. The computing device of claim 11, wherein the encoding and the decoding include at least one from among an adaptive coding algorithm and an error correction algorithm to enable real-time, one-pass data transmission.

13. The computing device of claim 10, wherein the converting of the encoded sound data includes binary data transmission based on a frequency modulation key shifting framework.

14. The computing device of claim 10, wherein the at least one acoustic wave includes at least one from among an audible sound wave and an inaudible ultrasonic sound wave.

15. The computing device of claim 10, wherein the processor is further configured to:
receive, via a plurality of third electroacoustic transducers, the at least one acoustic wave from a device; and
determine a location of the device by calculating at least one from among a distance and a direction of the at least one acoustic wave from each of the plurality of third electroacoustic transducers.

16. The computing device of claim 10, wherein the processor is further configured to:
receive, via at least one fourth electroacoustic transducer, the at least one acoustic wave from a device;
parse the at least one acoustic wave to identify a pairing token; and
initiate a pairing with the device based on the pairing token, the pairing relating to a wireless link with the device.

17. The computing device of claim 16, wherein the pairing token includes at least one predetermined parameter, the at least one predetermined parameter including a one-time use parameter.

18. The computing device of claim 10, wherein the processor is further configured to:
receive, via at least one fifth electroacoustic transducer, the at least one acoustic wave from a device;
parse the at least one acoustic wave to identify a payment token and payment information, the payment information including an account identifier; and
initiate a payment transaction based on the payment token and the payment information.

19. A non-transitory computer readable storage medium storing instructions for facilitating transfer of data by using sound, the storage medium comprising executable code which, when executed by a processor, causes the processor to:
receive, via a graphical user interface, a request, the request relating to a transfer of at least one file;
retrieve the at least one file from a memory;
encrypt, by using at least one token, the retrieved at least one file;
encode the encrypted at least one file into sound data, the sound data relating to an audio file format; and
convert, via at least one first electroacoustic transducer, the encoded sound data into at least one acoustic wave.

20. The storage medium of claim 19, wherein the converting of the encoded sound data includes binary data transmission based on a frequency modulation key shifting framework.

* * * * *